United States Patent
Ng et al.

(10) Patent No.: US 9,727,566 B2
(45) Date of Patent: Aug. 8, 2017

(54) SELECTING ADAPTIVE SECONDARY CONTENT BASED ON A PROFILE OF PRIMARY CONTENT

(71) Applicant: NBCUniversal Media, LLC, New York, NY (US)

(72) Inventors: Sheau Ng, Wayland, MA (US); Jeffrey Reale, Pompton Lakes, NJ (US); Shannon McKenzie, New York, NY (US); Yau Wei Yun, South Tower (SG); Sujoy Roy, South Tower (SG); Kong Wah Wan, South Tower (SG); Mohammad Khalid Bin Ahmad, South Tower (SG)

(73) Assignees: NBCUniversal Media, LLC, New York, NY (US); Comcast Cable Communications, LLC, Philadelphia, PA (US); Agency for Science, Technology and Research, South Tower (SG)

( * ) Notice: Subject to any disclaimer, the term of this patent is extended or adjusted under 35 U.S.C. 154(b) by 279 days.

(21) Appl. No.: 14/469,419

(22) Filed: Aug. 26, 2014

(65) Prior Publication Data

US 2016/0062995 A1   Mar. 3, 2016

(51) Int. Cl.
*G06F 17/00* (2006.01)
*G06F 17/30* (2006.01)

(52) U.S. Cl.
CPC .... *G06F 17/30044* (2013.01); *G06F 17/3005* (2013.01); *G06F 17/30029* (2013.01)

(58) Field of Classification Search
CPC ......... G06F 17/30029; G06F 17/30044; G06F 17/3005
USPC .................................................. 707/694, 758
See application file for complete search history.

(56) References Cited

U.S. PATENT DOCUMENTS

| | | | | |
|---|---|---|---|---|
| 7,882,140 B1* | 2/2011 | DiLorenzo | ............. | G06Q 30/02 707/802 |
| 2008/0126426 A1* | 5/2008 | Manas | .................... | G06Q 10/10 707/E17.019 |
| 2008/0133597 A1* | 6/2008 | Bardsley | ........... | G06F 17/30477 707/E17.102 |
| 2009/0248672 A1* | 10/2009 | McIntire | ............. | G06F 17/3002 707/E17.014 |
| 2012/0030209 A1* | 2/2012 | Bause | ................. | G06F 17/3002 707/741 |
| 2012/0151320 A1* | 6/2012 | McClements, IV | . | G06Q 10/101 715/230 |
| 2012/0158743 A1* | 6/2012 | Gardner | ............ | G06F 17/30038 707/748 |
| 2012/0179703 A1* | 7/2012 | Ajitomi | ............. | G06F 17/30386 707/765 |

* cited by examiner

*Primary Examiner* — Phong Nguyen
(74) *Attorney, Agent, or Firm* — Lee, Hong, Degerman, Kang & Waimey PC

(57) ABSTRACT

A content adaptation method includes: obtaining a primary metadata profile associated with a particular time point of primary content; obtaining secondary metadata profiles each associated with corresponding secondary content of a plurality of secondary content; identifying one of the plurality of secondary content associated with a secondary metadata profile having a desired similarity value with the primary metadata profile associated with the primary content; and matching the identified secondary content with the particular time point of the primary content.

22 Claims, 8 Drawing Sheets

SELECTING ADAPTIVE SECONDARY CONTENT BASED ON A PROFILE OF PRIMARY CONTENT

BACKGROUND

Multimedia content broadcast via television programming is often altered from the original version of the multimedia content. These alterations are sometimes performed to remove portions of the content, perhaps to allow the program to fit a certain time limit or remove explicit or offensive material not suitable for the intended viewing audience. The alterations also include the insertion of secondary content at certain portions of the program, such as promotional material for other television programs, or advertisements and commercials.

However, these alterations are often performed without considering the context of the alteration within the primary content of the broadcast, or the effect on the viewer resulting from the alterations. Thus, the removal of portions of primary content, or the insertion of secondary content within a broadcast often have little to no relation to the content of the program being broadcast at the alteration point.

In the case of inserting secondary content, selection of a particular piece of promotional material is often based solely on time constraints or on general information of the entire content being broadcast. Therefore, secondary content such as commercials are often inserted into a broadcast without regard to the subject matter or contextual information of the content being broadcast at the point of insertion. In the case of editing or removing portions of the program, the editing may include simply cutting out certain portions or the insertion of additional secondary content to replace undesired material, such as inappropriate content for a target audience, or to convey a desired effect to the viewer.

However there is a lack of effective systems or methods to perform alterations of primary content programming based on information currently available related to the primary content or secondary content, and laborious manual analysis and effort is required to achieve such results.

Therefore, as more and more information related to programming content and promotional and other secondary content becomes available in the form of metadata, there is a need for a system and method to identify metadata profiles of primary content and secondary content to selectively adapt secondary content for insertion points within the broadcast content to produce a desired effect to the viewer.

SUMMARY

According to one embodiment, a content adapting method includes: obtaining a primary metadata profile associated with a particular time point of primary content; obtaining secondary metadata profiles each associated with corresponding secondary content of a plurality of secondary content; identifying one of the plurality of secondary content associated with a secondary metadata profile having a maximum similarity value with the primary metadata profile associated with the primary content; and matching the identified secondary content with the particular time point of the primary content.

According to one embodiment, a metadata profile of primary content may include multiple metadata factors relating to the content of the primary content. Each metadata factor may be assigned a metadata class with a ranking or a weight indicating an importance level of the metadata class.

According to another embodiment, a content adaptation method includes: obtaining a primary metadata profile associated with primary content, the metadata profile comprising a running metadata index for a metadata factor of the primary content; obtaining secondary metadata profiles each associated with corresponding secondary content of a plurality of secondary content; obtaining a metadata index value of the primary content at a particular time point; selecting one of the plurality of secondary content associated with a secondary metadata profile having a desired similarity value with an intended metadata index value of the particular time point; and matching the selected secondary content with the particular time point to produce the intended metadata index value.

According to another embodiment, a system for adapting content includes: a metadata generator configured to obtain a primary metadata profile of primary content comprising information related to the primary content; and a selection system configured to select secondary content associated with metadata having a desired similarity value with the primary metadata profile of the primary content at a particular time point.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It will be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for providing broadcast content, multicast content, online and/or on-demand content, or other primary content with adaptive secondary content based on metadata of the primary content. The metadata of the primary content may be represented by a metadata profile which may consist of a snapshot of metadata information at a particular time point or time points of the primary content, or include a running index for the duration of the primary content. Each secondary content may also have a metadata profile, and the metadata profiles of the primary content and the secondary content may be based on metadata describing or associated with the details of the content.

The secondary content may be selected based on a determined correlation between the metadata profile of the primary content and the metadata profile of the secondary content. The metadata profile of the primary content may be associated with an intended insertion position of the secondary content. The system may select secondary content having a metadata profile which has a desired similarity level with the metadata profile of the primary content at the intended insertion position. Multiple secondary content may be selected for a single primary content, and a single primary content may have multiple metadata profiles associated with different time points of the primary content. The matching of secondary content with an insertion position of the primary content may be based on a maximum similarity of metadata, a minimum similarity of metadata, or a desired level of similarity in between the maximum and minimum similarity levels to produce a specific desired effect.

According to a particular embodiment, the system may include a metadata generator configured to generate metadata associated with the primary content, and may generate multiple instances of metadata each associated with different time points of the primary content. The metadata generator may further be configured to generate metadata associated with the secondary content.

Figure 1:
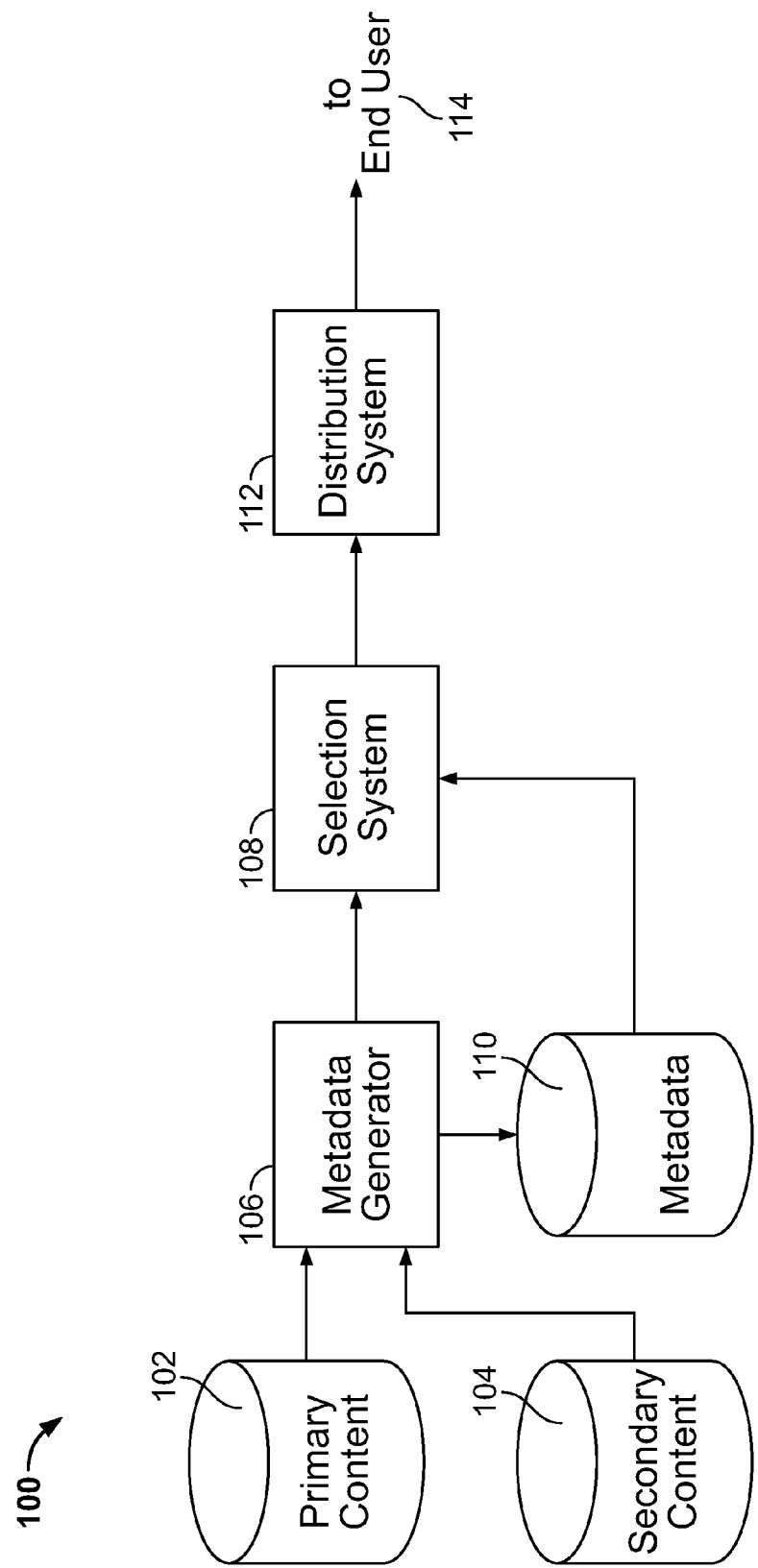
FIG. 1 illustrates an example of a system for selecting secondary content based on a profile of primary content according to one embodiment.

FIG. 1. illustrates a system 100 for selecting secondary content based on a metadata profile of primary content according to one embodiment. The system may include a database 102 located on a storage unit and configured to store primary content information and a database 104 located on a storage unit and configured to store secondary content information. In other embodiments, the primary content and secondary content may be stored in a single database or storage unit, or may be stored across multiple databases or storage units.

The system 100 further includes a metadata generator 106 according to one embodiment. The metadata generator 106 obtains primary content from the primary content database 102 and generates metadata information in the form of metadata profiles, as will be discussed in further detail. The metadata generator 106 provides or generates metadata related to the primary content of the primary content database 102 and the secondary content of the secondary content database 104, as will be discussed in further detail.

The metadata generator 106 may generate the metadata concurrently with a process for selecting primary and secondary content to be distributed and displayed to an end user. Thus the metadata generator 106 may generate the metadata directly for use by a selection system 108. In other embodiments the metadata generator 106 may generate the metadata and cause it to be stored in a database 110 for storing the metadata, located on a storage unit. In an embodiment of system 100, the metadata generator 106 is implemented using a computer by execution of software comprising machine instructions read from computer-readable medium. Metadata generator 106 may further include an input/output interface, graphical user interface, or other input/output means to allow the input/output of information related to generation of the metadata.

With continued reference to FIG. 1, the system 100 also includes a selection system 108 which receives metadata related to the primary content and the secondary content either from the metadata generator 106 or the metadata database 110 storing the metadata and metadata profiles. The selection system 108 is configured to select secondary content to be matched and inserted into the primary content based on the metadata and metadata profiles of the primary content and secondary content.

As will be discussed in further detail, the selection system 108 may be configured to select secondary content to be matched with primary content based on a variety of factors and desired outcomes. In an embodiment of system 100, selection system 108 is implemented on a computer by execution of software comprising machine instructions read from computer-readable medium. Selection system 108 may further include an input/output interface, graphical user interface, or other input/output means to allow the input/output of information related to selection of primary and secondary content. In certain embodiments, the metadata generator and selection system may be implemented using a single computer, in other embodiments multiple computers, input/output systems and hardware may be used to implement the system. The selection system 108 may be configured to output the selection of primary content and secondary content to a distribution system 112 configured to distribute the primary and secondary content to an end user 114. The output may include a signal including the primary content and secondary content, information enabling retrieval of the primary content and secondary content, or any other information, signal, or data related to or facilitating distribution of the content to an end user 114. According to an embodiment of the present invention, the distribution is performed in cooperation with a communication channel such as a satellite communication channel. According to other embodiments, the transmission is performed in cooperation with a terrestrial (e.g., over-the-air) communication channel. According to other embodiments, the transmission is performed via fiber-, cable- or Internet-based technologies.

According to yet other embodiments, the content is distributed using physical media. For example, the primary and secondary content may be distributed using video tapes, DVDs, other types of storage media, hard drives, etc.

Figure 2:
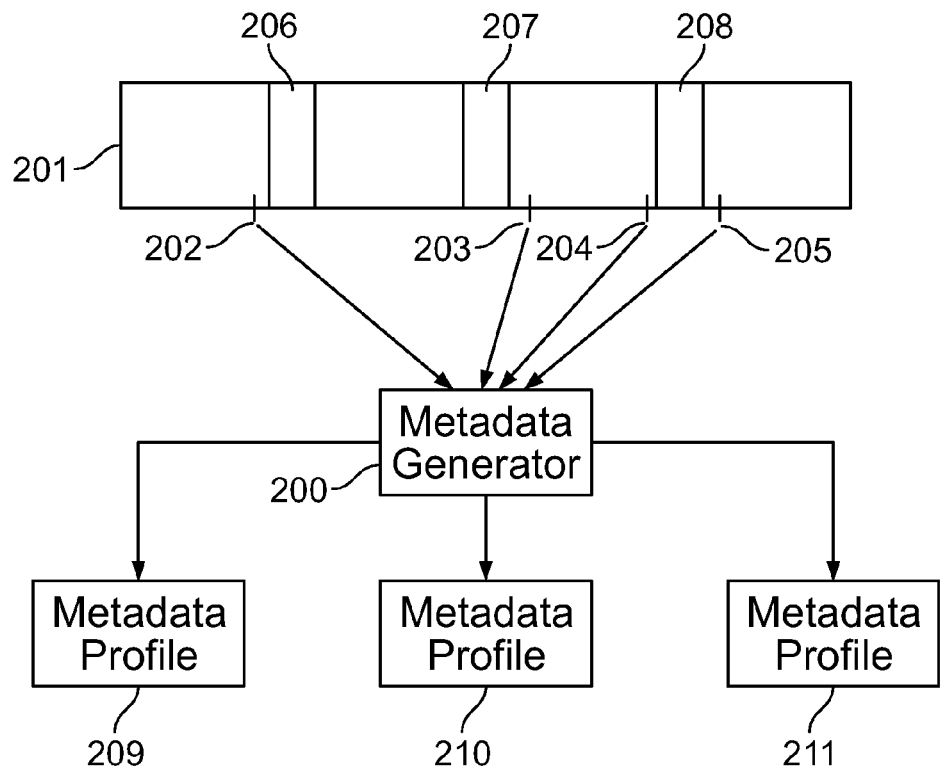
FIG. 2 illustrates an example of generating metadata profiles of primary content according to one embodiment.

FIG. 2 illustrates a block diagram of a metadata generator 200 configured to generate metadata for primary content 201 and secondary content. The metadata generator 200 may be configured to process content including video, audio, images, text, combinations thereof, and the like, and generate information associated with the content in the form of metadata. Metadata may be used to describe content and may include any information that may be associated within the content, or the content itself. Some traditional examples of metadata of a program include the actors who appear in a program, the year of the program's release, rating, language, and the genre of the program.

In certain embodiments, the metadata generator may be configured to generate metadata which includes far more granular information associated with multiple and various time points of the primary or secondary content. For example, the generated metadata may describe not only the genre of the entire program and the language of the entire program, but it may describe the mood of a certain scene at a particular time point, the activity being depicted in the scene, or a certain product or brand name which appears in the scene. In an example where the primary content is a documentary, the generated metadata may include not only the subject matter of the documentary, but may also describe a historic event being discussed at a particular time point, the mood conveyed by the event, the landscape depicted in the event, or a country in which the event being described take place.

As shown in FIG. 2, the metadata generator may be configured to generate the metadata for the primary content at specific time points 202, 203, 204, 205 and may generate metadata profiles 209, 210, 211 corresponding to spots 206, 207, 208 of the primary content. In other alternative embodiments, the metadata generator may be configured to generate metadata for the primary content at time points separated by a standard or set interval such as every 30 seconds or 1 minute, at time points separated by random intervals, at time points preset that are independent of spots. In other embodiments, the metadata generator may be configured to generate a running index of specific metadata factors, such as tone or mood. In such examples, the metadata generator may generate a value of the specific metadata factor for each specific time point of the primary content.

In the example shown in FIG. 2, specific time points 202, 203, 204, 205 may be determined based on the position of a number of placeholders within the primary content, otherwise known as spots 206, 207, 208 where secondary content is intended to be inserted. In the context of television programming, when a program is produced or planned, there may be pre-defined spots scattered within the program in which short-form secondary content, such as promotional material including advertisements, are intended to be slotted when the program is broadcast on a particular TV channel during a particular time. These pre-defined spots may be defined by a certain number of black frames to allow a broadcast center or other distributor of the program to switch the broadcast to the secondary content.

The spots may be identified manually by the creator of the primary content or by the broadcaster of the primary content. The spots may also be identified randomly, or they may be identified automatically based on factors such as a set time interval. The spots may each have a preset time duration consistent across all spots of the primary content, or the spots may vary in time duration according to a preset variation or a random variation. In certain embodiments, each of the spots may be assigned a metadata profile for selection of secondary content to be inserted into the spot.

To select a secondary content (the details of which will be discussed further) for spot 206, time point 202 may be input to the metadata generator to determine the metadata profile 209 of the spot 206. The input time point 202 may represent the primary content just prior to the starting time point of the spot. Alternatively, time point 203 which immediately follows the conclusion of a spot 207 may be input to determine the metadata profile of the spot.

Additionally, multiple time points 204 and 205 may be input to the metadata generator to determine a range of metadata information for a spot 208, to represent the primary content just prior to, and immediately following, the spot 208. In other embodiments, the metadata generator may generate multiple metadata profiles for a time point based on surrounding time points, or may aggregate multiple time points into a single metadata profile to represent a single time point.

In other embodiments, the metadata generator may generate metadata including information of a trend of a particular metadata factor across multiple time points. For example for spot 208, the metadata generator may be configured to determine metadata information for at least two distinct time points 204, 205 associated with the spot 208. The metadata generator may then generate metadata profile 211 with information related to a difference between the metadata of the two time points with respect to a single metadata factor. For example, for a metadata factor related to mood, the metadata generator may detect that the mood is becoming happier in the primary content between time point 204 and time point 205. This information related to a trend of metadata may also be performed by the metadata generator by calculating a running index of a certain metadata factor throughout the duration of the primary content.

Figure 3:
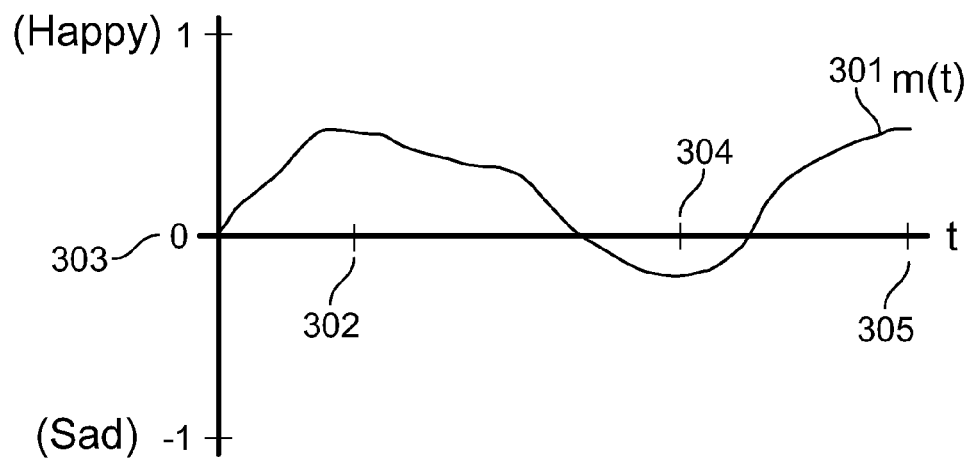
FIG. 3 illustrates an example of a running metadata index for a duration of primary content according to one embodiment.

According to an embodiment, a metadata profile may comprise a running metadata index. For example, FIG. 3 illustrates a graphical representation of a running index of the metadata factor of mood, with a variation between happy and sad, throughout the time (t) duration of the primary content. The metadata generator may be configured to calculate the running index based on detected information and factors from the primary content (discussed later in further detail). The running metadata index may be assigned a quantitative value with a base of zero, maximum value of 1, and minimum value of −1. For example, an index value of 1 would represent an extremely maximum mood of happiness in the primary content, and an index value of −1 would represent an extremely minimum value of happiness (or maximum value of sadness) in the primary content.

In the graphical representation 300 example of FIG. 3, the running metadata index may be represented by a curve 301 corresponding to a metadata function m(t) across the duration time t of the primary content. For example, the graphical representation 300 of FIG. 3 may correspond to a metadata profile of a full length feature movie. In this example, time point 302 may represent an initial time of the movie during which the characters are enjoying a happy time in the story. Further, time point 304 may represent a conflict in the storyline, during which the characters are less happy, resulting in metadata reflecting the less happy or sad mood of the characters. Finally, 305 may represent a resolution of the conflict and a happy ending of the story, resulting in metadata reflecting a happy mood.

In other embodiments, a metadata profile of primary content may also be obtained from sources external to the content itself. These external sources may include third party information databases such as Wikipedia, Internet Movie Database (IMDB), TV GUIDE, or other sources including social media, crowd sourcing databases, viewer reviews, and the like.

In other embodiments, a metadata profile may comprise information related to the environment of the viewer viewing the primary content. For example, viewing environment information may include detected information of the viewing environment such as brightness, ambient noise, video display size, number of viewers, and the like. Viewing environment information may be entered by a user, obtained from third party sources, or detected using various environment detectors including microphones, cameras, and motion sensors.

In other examples, viewing environment information may also include information of a viewer of the content including personal or biometric information. Information of a viewer may include age, gender, weight, education level, occupation, personal viewing preferences, recently viewed content, favorite brands or products, and the like. Further, biometric information of a viewer may include information such as heart rate, blood pressure, fitness level, exercise frequency, exercise duration, and the like. Personal and biometric information may be entered by a user, obtained from third party sources such as social media information, biometric measurement devices such as heart rate monitors and personal activity monitors, information obtained from the viewer's mobile devices, and the like.

Figure 4:
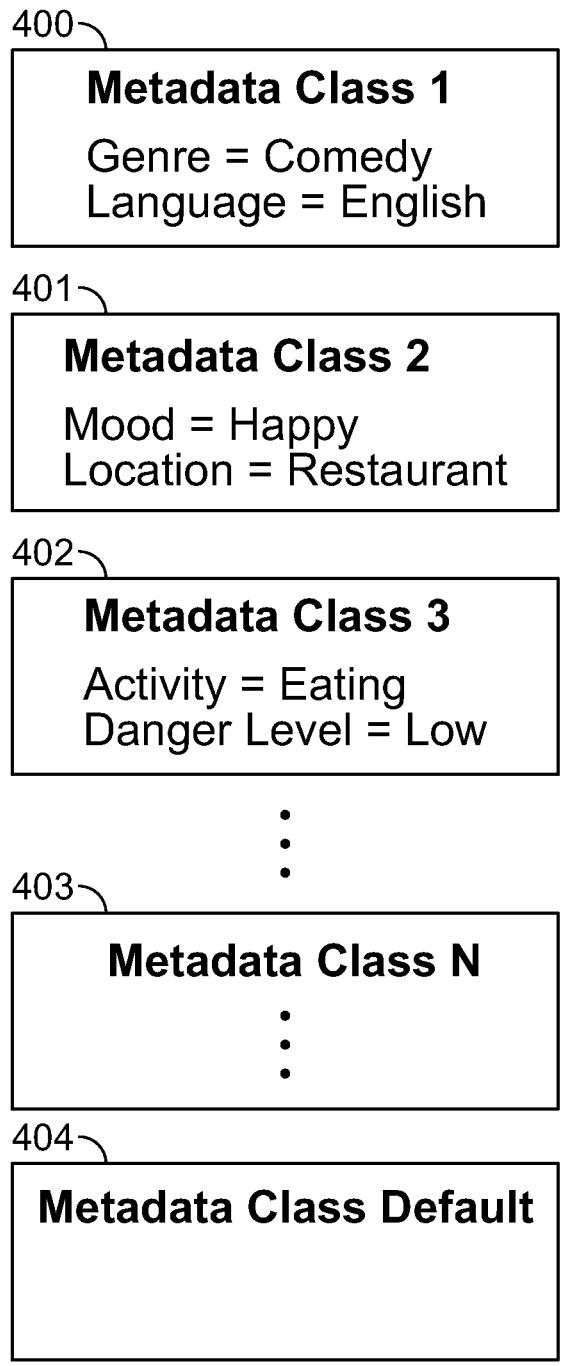
FIG. 4 illustrates an example of a metadata profile of primary content according to one embodiment.

According to another embodiment, a metadata profile may comprise metadata information associated with a particular time point within a portion of content, or even the entire aggregate information of the content. FIG. 4 illustrates a block diagram of a metadata profile for a particular spot as previously discussed according to one embodiment. It will be understood that the generation of a metadata profile may apply to spots of primary content, the viewing environment, information from third party sources, as well as various time points or the entirety of secondary content. Additionally, metadata profiles may be based on various aspects of content, either individually or in combination. For example, a metadata profile may be based solely on the audio of content or solely on video of content, without information contributed from the other.

The metadata generator may generate a metadata profile for a particular spot contemporaneously with the generation of the metadata as discussed above, or the metadata profile may be generated at a time independent of the metadata generation, and may be stored in a memory and associated with the time point of a primary or secondary content for retrieval.

Various factors of metadata may be detected and generated for a particular spot. For example, the metadata for a spot may include traditional information about the primary content such as genre, language, and age rating. The primary content may be a news program, a sports program, a drama program, a radio program, or internet video content, or combinations thereof and the like.

In the example of a sporting event, metadata traditionally associated with such programs may include the teams involved in the event, the current score of the game, the current position of the ball on the field, and the time remaining in the event. In the example of a drama program, the traditionally associated metadata may include actors appearing in the program, genre of the program, year of release, language, and rating. These traditional metadata factors may be manually assigned to the primary content or they may also be detected and generated by the metadata generator.

The metadata generator may be configured to detect additional metadata factors not traditionally associated with content, such as mood, location, activity depicted, food consumed, sports being played, brand names displayed, gender of characters, level of danger, level of suspense, etc. The metadata generator may be configured to detect metadata factors by processing and analyzing various information and data from the primary or secondary content.

For example, the text included in the closed captioning information for a particular program may be analyzed for metadata factors indicating mood, activity, location, subject matter, violence, etc. In another example, the audio of the content may be analyzed using speech to text processing to obtain the metadata information, as well as analyzing the volume, cadence, or pattern of the audio itself, such as sudden explosions, gunshots, characters yelling or screaming, tone or pace of background music, or various soundtrack or audio information to derive metadata information associated with the content. In other embodiments, metadata may be generated from production material, such as a program's script, production notes, storyboards, or storylines. Other examples of metadata generation sources may include analyzing video of the content, including frequency of cut scenes, text displayed on the video, faces detected on the video, locations detected on the video, particular events occurring in the video, particular objects displayed in the video, color data extracted from frame pixels, actions of the characters detected, and the like.

Metadata information in the form of text may be parsed and stemmed to produce consistent and comparable information, including base text strings. Stemming algorithms for removing the commoner morphological and inflexional endings from words, such as the Porter Stemming algorithm known in the prior art, may be used to obtain base metadata information for compatible comparison with other metadata information.

Information related to color data of the content may also be used to obtain metadata information. For example, chrominance data extracted from frame pixels may be used as a contributor to indicate the mood of a scene (i.e., the red/orange glow of a fire indicating a warm scene as opposed to a grey/blue color of a moonlit night indicating a dramatic, scary, or cool scene). Extraction of color data from video may be achieved using various methods, including averaging RGB (red-green-blue) values per frame, analyzing patterns of vectorscope data (for example, a vector representation of a pixel where vector direction represents hue and vector magnitude represents saturation), and the like.

Manually assigned or generated metadata information may be compiled to form a metadata profile for a certain spot in primary content or secondary content. For secondary content, the metadata profile may be generated using only a single time point of the secondary content, as the length of the secondary content, including promotional material or advertisements, may be significantly shorter than the length of the primary content. Alternatively, the metadata generator may detect metadata from multiple time points of the secondary content to generate the metadata profile, or may aggregate metadata from multiple time points of the secondary content to generate the metadata profile. Alternatively, a running metadata index may be generated to track changes in metadata factors across the duration of the secondary content.

As shown in FIG. 4, a metadata profile may include varying classes of metadata. Classes of metadata may be predefined for the primary or secondary content, or classes may be automatically generated and assigned based on varying factors such as, a time of a content broadcast, an intended target audience of the broadcast, or a medium in which the content is being consumed. The metadata may also be categorized based on a source from which the information is received or detected. For example, metadata about the viewing environment may be classified in one metadata class, personal data about the viewer may be classified in another metadata class, and data from a third party source such as Wikipedia may be classified in yet another metadata class of the same metadata profile. These classes may be created in the same metadata profile as other classes relating to the content itself, such as language, rating, genre, etc.

One or more classes of metadata may be defined as required metadata classes for primary content. These required metadata classes may include the traditional factors of metadata, such as language and genre. For secondary content, the required metadata classes may define metadata factors which must be assigned for the secondary content in order for the secondary content to be matched and selected for insertion into a spot. In embodiments with a running metadata index in the metadata profile, the metadata factor being tracked in the metadata index may be considered a required metadata factor. In the embodiment depicted in FIG. 4, metadata class 1 (400) is required as a metadata class.

The remaining non-required metadata classes 401, 402, 403 may be ranked based on their importance for matching primary content to secondary content. In selecting secondary content for insertion into a spot of primary content, the metadata class of a metadata factor may determine a weight to be applied to the metadata factor (to be discussed in further detail). For example, metadata class 2 (401) may include metadata factors which are determined to be the most important or desired criteria for matching secondary content to a spot of primary content.

In the depicted embodiment, the mood and the location depicted in the primary content for the spot (either just prior to the spot or just following the spot, as previously discussed), may be assigned to metadata class 2. Further, metadata class 3 (402) may include metadata factors such as the activity being depicted in the primary content and the level of danger conveyed in the primary content.

Metadata factors may be assigned to classes up to an indefinite number N of metadata classes 403. Additionally, certain metadata factors may not be assigned to a particular metadata class at all. These unassigned metadata factors may be assigned to a default metadata class 404 reserved for unassigned metadata factors, and the metadata factors assigned to a default metadata class may not be assigned a weight value.

Figure 5:
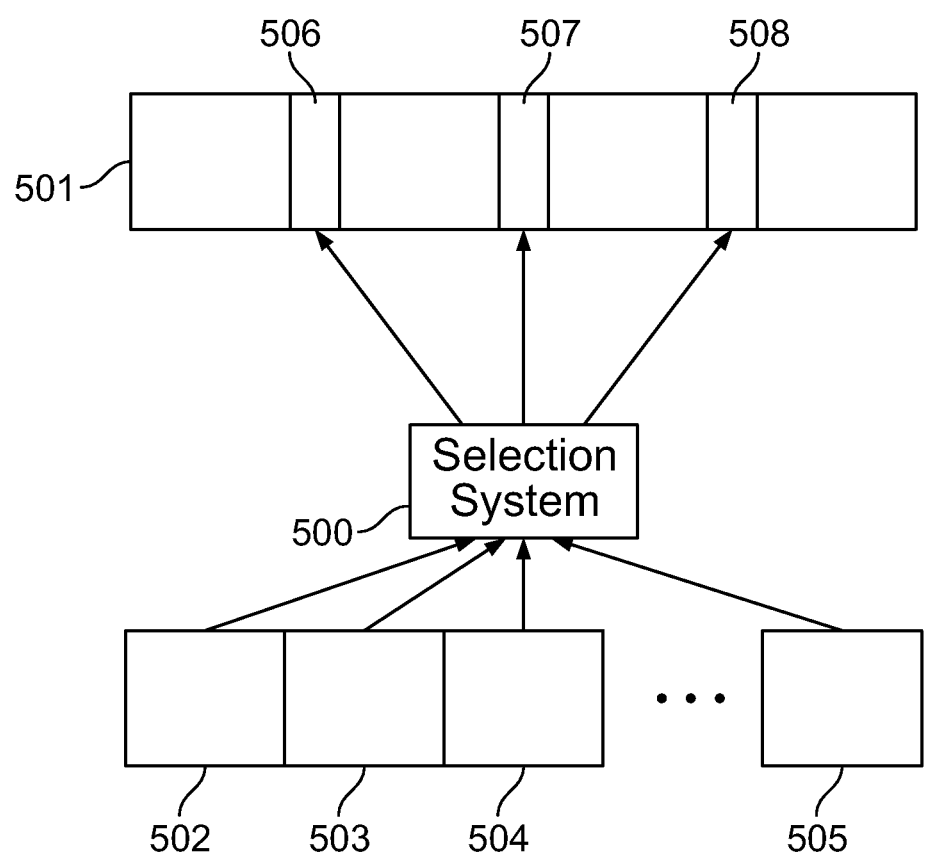
FIG. 5 illustrates an example of selecting secondary content based on metadata profiles of primary content according to an aspect of the present invention.

FIG. 5 illustrates a block diagram of a secondary content matching and selection system according to one embodiment of the present invention. The selection system 500 may be configured to match and select secondary content 502, 503, 504, 505 for insertion into primary content 501. As previously discussed, primary content 501 may include several spots 506, 507, 508 which are preset for insertion of secondary content by a broadcast center or other content distributor.

In certain embodiments, the selection system 500 may be configured to retrieve the metadata profiles generated for the spots of the primary content and the secondary content to match and select the secondary content. A memory may be provided to store the generated metadata profiles and information for retrieval. In other embodiments, a metadata generator may be provided in the selection system 500 to generate metadata profiles for the primary content and the secondary content to provide metadata information contemporaneously. In other embodiments, the metadata generator may be provided as a separate component or system, or it may be incorporated into the selection system 500.

As previously discussed, the selection system 500 may be configured to match and select secondary content to spots of the primary content according to the metadata profiles. In other embodiments, the selection system 500 may be configured to determine the metadata index value at the given time point to match and select secondary content to the spot. For the purposes of this discussion, metadata associated with a spot will be referred to generally as metadata of primary content, however it will be understood that metadata of primary content may refer to metadata associated with a particular spot of the metadata.

By matching secondary content based on information related to the content of the primary content at the spot, the secondary content may have an intended effect in a viewer regarding the secondary content, the primary content, or both. For example, if the metadata profile associated with a spot 506 of primary content 501 includes a metadata factor indicating that the mood of the primary content is romantic, selecting and inserting secondary content, such as a promotional material or advertisement, which also has a metadata factor indicating a romantic mood may increase the desired effect on the viewer.

In certain embodiments, the selection system 500 may be configured to match and select secondary content which is most similar (discussed later in further detail) to the metadata profile of the primary content.

Secondary content may include promotional material, which includes informative content related to another primary content, such as the broadcast of another television show which the viewer may be interested in. By matching the metadata profile of the primary content to a similar metadata profile of a secondary content, viewer interest in the promotional material may be optimized. Other secondary material such as advertisements may also be matched and selected based on the same criteria.

In other embodiments the selection system may be configured to match and select secondary content associated with a metadata profile which is most dissimilar to the metadata profile of the primary content. For example, if a metadata associated with a spot 507 indicates a suspenseful mood and a high danger level in the primary content, secondary content 504 such as an advertisement may be selected which has a metadata profile with a low danger level and a mood of feeling safe and secure. This may be desired if the advertisement is related to products or services where safety and security is a selling point, such as automobiles, life insurance, or home protection systems.

In certain instances, secondary content, such as promotional material or advertisements, may only have a single associated metadata factor. This may be the case due to the relatively short length of most secondary data such as advertisements. For example, a car commercial which emphasizes the car's quiet and comfortable ride may be associated with the metadata factor of quality, with a metadata value of "luxury." Another commercial for the same car may emphasize the car's speed and acceleration, and therefore be associated with the metadata factor of mood, with a value of "excitement." Yet another commercial for the same car may emphasize the car's safety, and therefore be associated with the metadata factor of danger level, with a value of "low." In this way, a secondary content provider may produce multiple versions of the content with a targeted emphasis in mind for each, and the selection system 500 may select each secondary content for the most appropriate spot within the primary content.

In another example, secondary content may provide continuity in the primary content by relating to, or allowing for a transition of the primary content. In such embodiments, the viewer may experience a higher level of continuity and familiarity with the secondary content since a high level of continuity is established from the primary content to the secondary content. This may be desirable for a provider of primary content as the viewer may enjoy the primary content more without jarring and unexpected transitions, and the secondary content may even be used to progress the primary content, or prime the viewer's experience for upcoming scenes or events with a transition performed using secondary content.

This may also be desirable for a provider of secondary content as the viewer may be more receptive to the topic or subject matter of the secondary content if the viewer is primed for the transition to the subject matter of the secondary content. For example, if primary content depicts a scene at a particular location such as a beach, a secondary content related to a car may be selected which shows a car entering or exiting a beach location. In another example in which a metadata profile includes data about the viewing environment of the viewer, if a viewing environment is detected as dark or dimly lit, a secondary content may be selected which matches the viewing environment data to avoid a startling transition to the secondary content for the viewer. Alternatively, a secondary content may be selected which has an opposite metadata value of a high level of brightness, in order to grab the attention of the viewer.

In other instances, secondary content may be associated with multiple metadata factors, and the selection system 500 may calculate which secondary content has the strongest (or weakest, depending on the desired outcome) similarity with the primary content based on the metadata factors. In embodiments in which a metadata profile includes a running metadata index, since the index may only be tracking one metadata factor at a time, each secondary content may be considered for matching only the same metadata factor (or change in the factor). For the purposes of this discussion, it will be considered that metadata profiles of secondary content may include multiple metadata factors across multiple classes. However, it will be understood that secondary content may be selected based on a single metadata factor of a single metadata class.

In some embodiments, the primary content and secondary content may include only one or a few aspects of content, such as the audio of content, video of content, displayed text of content, and the like. In these embodiments, the secondary content may be selected to be inserted into the primary content to replace only one or a few aspects of the primary content, to be experienced along with the remaining aspects of the primary content which remain unchanged.

For example, a selected secondary content may include only an audio track with a comedic upbeat soundtrack, and it may be selected for insertion into a primary content, wherein the primary content is only the audio soundtrack of content. The secondary content may be inserted into a spot of the primary content to modify the tone of a scene of the primary content by replacing the original audio soundtrack at the spot. Therefore, if a scene at the spot of primary content is a scary or suspenseful scene, the metadata index for tone may be shifted to a desired tone by inserting the selected secondary content to achieve an upbeat or comedic effect resulting from a viewer experiencing the scene with a different soundtrack. Thus in certain embodiments, the secondary content may be inserted into primary content to replace only certain aspects of the primary content, and may not replace an entire portion of all aspects of the primary content entirely.

To match metadata profiles of secondary content and primary content, the metadata information and classes of secondary content may be analyzed. Algorithms and modeling may be used to evaluate and compare metadata profiles of content. For example, in certain embodiments a vector space model may be used to represent metadata profiles and classes. In other examples, other algorithms and modeling methods such as Boolean logic, search algorithms, set theory, and document modeling may be utilized. For the purposes of discussion, an embodiment utilizing the vector space model will be discussed, however one of ordinary skill in the art will understand that other algorithms and modeling methods may also be utilized to represent metadata information and perform comparison analysis between metadata profiles of primary and secondary content.

In considering a vector space model representation, if a metadata factor of metadata class 1 is detected for a secondary content, the factor may be represented in a metadata class 1 vector by a non-zero vector value in the vector dimension assigned to the particular metadata factor. If the metadata factor of class 1 is not detected by the metadata generator, the factor may be represented by a vector value of zero for the assigned vector dimension. In this embodiment, the vector space representation may allow for selection system 500 to quickly and efficiently compare and disregard secondary content having a metadata profile lacking required metadata factors in metadata class 1.

In a simplified example, metadata profiles of content may include class 1 metadata represented by primary metadata vector $m_p = (f_1, f_2, f_3, \ldots, f_i)$ and secondary content metadata vector $m_s = (f_1, f_2, f_3, \ldots, f_i)$, where f represents a metadata factor and i represents the total number of metadata factors assigned to class 1. If a metadata factor $f_i$ is not present in $m_p$ or $m_s$, the vector value $f_i$ may be assigned a zero value.

In such embodiments, a logical AND operation with vectors $m_p$ and $m_s$ may provide a determination of whether the metadata profile of the secondary content includes all required metadata factors of class 1, according to the metadata profile of the primary content. In certain embodiments, the selection system 500 may be configured to disregard secondary content lacking some or all of the required metadata factors of metadata class 1.

In the embodiment of the current example, the vector space model may also be implemented to represent the remaining metadata classes of the primary or secondary content and to determine an optimal match between secondary content and a spot of primary content based on the metadata profiles. One of ordinary skill in the art will understand that the vector space model may be used to represent text and word strings as well as entire text documents for comparison with other word strings and documents, and its application to the metadata information generated in the metadata classes.

For example, the metadata of the primary content may be mapped to vector $v_p$ for each class k and N total classes. Similarly, the metadata of the secondary content may be mapped to vector $v_s$ corresponding to a vector mapped to the metadata factors of the secondary content for each class k of N total classes. The selection system 500 may be configured to compute a similarity value between $v_p$ and $v_s$ to determine a quantitative similarity value between the metadata vectors of each class k, and may further calculate a total similarity value between the metadata profiles of the primary and secondary content using the cosine similarity measure of vectors $v_p$ and $v_s$.

Specifically, the similarity value $sim_k(v_p, v_s)$ for each class k between the metadata profile of primary content p and secondary content s, where i is the index of vector dimensions corresponding to each metadata factor, may be derived using the following Equation 1:

$$sim_k(v_p, v_s) = \frac{\sum_{i=1}^{n} v_{i,p} \cdot v_{i,s}}{\sqrt{\sum_{i=1}^{n} v_{i,p}^2} \cdot \sqrt{\sum_{i=1}^{n} v_{i,s}^2}}$$ Equation 1

The range of Equation 1 is −1 (representing the absolute opposite), to 1 (representing an identical metadata profile). Additionally, as Equation 1 will return a similarity value for the particular class k, a weight $w_k$ may be applied to the similarity value based on an importance or a ranking of the metadata class. The value of $w_k$ may be manually assigned or it may be generated based on a variety of factors, and the value may be positive or negative integer or decimal values. In these examples, the aggregation of the similarity between each metadata class is done using a weighted value. However, one of ordinary skill in the art will understand that it can also be done using other criteria such as the Choquet Integral, or other utility expectation or probability functions.

For example, if a primary content program is related to cooking, a metadata class associated with food and cuisine may be assigned a higher weight for the metadata class. This may be assigned manually or it may be assigned automatically based on the detected metadata information. Alternatively, the weights of each class may be based on the class rank number, for example class 2 may be associated with the highest weight, and class N, where N is the total number of classes, may be associated with the lowest weight.

To obtain a total similarity value $sim_{p,s}$ for the primary content and secondary content, the sum of all of the similarity values for each class may be obtained using Equation 2:

$$sim_{p,s} = \sum_{k=2}^{N} w_k sim_k(v_p, v_s)$$ Equation 2

In certain embodiments, the secondary content with the maximum value of $sim_{p,s}$ may be selected for insertion into a spot of the primary content. In other embodiments, the minimum $sim_{p,s}$ value may be desired, as previously discussed based on the desired effect on the viewer.

Returning to FIG. 5, the selection system 500 may be configured to obtain metadata profiles for a spot 506 of the primary content 501 and some or all available secondary content 502, 503, 504, 505. The metadata profiles obtained for secondary content may correspond to a single time point of the secondary content as the secondary content may be significantly shorter in length than the primary content. For the particular spot 506, the selection system 500 may iterate through the secondary content 502-505 to determine and select the secondary content with the highest similarity value with the metadata profile associated with spot 506.

In certain instances, the metadata profile of the primary content may lack metadata factors of required class 1. For example, certain programs may be missing important metadata such as language or genre. In these instances, the selection system 500 may bypass checking metadata class 1 factors for the secondary content 502-505, so that all secondary content is considered for selection, regardless of the required metadata factors.

If primary content 501 is not missing metadata class 1 factors, the selection system 500 may first determine, for each secondary content 502-505, whether the secondary content includes all required metadata factors of metadata class 1, using the vector space model as previously discussed. In certain embodiments, secondary content lacking any metadata class 1 factor may be eliminated from consideration. Eliminating secondary content lacking metadata class 1 factors may have the benefit of optimizing the selection system 500 by reducing the secondary content candidates for spot 506.

If a metadata profile of secondary content includes all required class 1 factors, the selection system 500 may map the metadata profile to a data model, such as a representative data vector as previously discussed. Using a similarity algorithm, such as Equation 1, a similarity value of the metadata profiles of the primary and secondary content may be obtained using a total similarity algorithm, such as Equation 2. Based on a variety of factors, or based on a manual setting, the selection system 500 may select one of the secondary content 502-505 having the maximum total similarity value. Alternatively, the selection system 500 may select one of the secondary content 502-505 having the minimum total similarity value.

The selection system 500 may iterate through all spots 506-508 of primary content 501 to select secondary content for insertion into each spot. If the similarity values for all secondary content 502-505 are zero, or are all lower (or higher) than a desired threshold value, the selection system 500 may be configured to simply select secondary content at random, or may be configured to select secondary content having metadata in the default class, which may be unranked and not assigned a weight as previously discussed. Metadata factors of the default class may be designed to be neutral and balanced to be inserted into any spot of the primary content, regardless of the metadata associated with the spot without negatively affecting the viewing experience.

In embodiments where the metadata profile of the primary content includes a running metadata index, the selection system may determine a similarity value of secondary content based on the degree of a particular metadata factor. In other embodiments, the selection system may be configured to determine a change in the metadata factor at a spot of primary content, and may select secondary content having a high similarity value in the change in the metadata factor, or having an opposite change in the metadata factor. In certain embodiments, the selection system may be configured to select secondary content to produce a creative effect on the primary content and the viewer by selecting and introducing secondary content having a particular metadata factor, or change in metadata factor.

For example, a producer of a program may select secondary content having a high metadata factor of comedy for insertion to a spot of primary content having a metadata profile indicating a somber mood. Insertion of such an unrelated secondary content may have the effect of lightening the mood of a viewer, or perhaps to prime the viewer for upcoming events with high comedic mood. In another example, a producer of a program may select secondary content having a metadata index trend of high level of violence changing to peacefulness to counteract a metadata index trend of increasing violence at a spot of primary content.

Figure 6A:
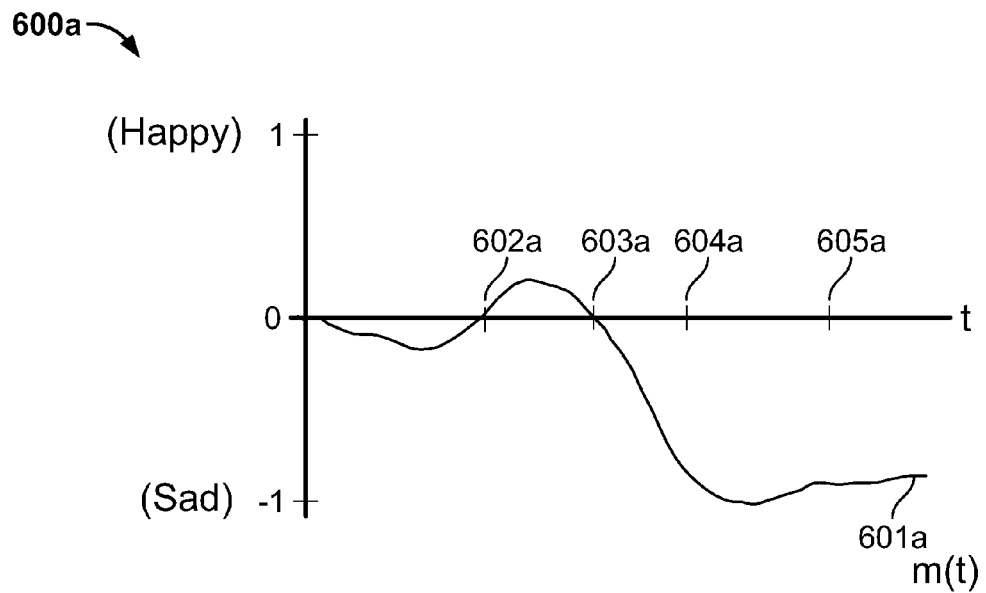
FIG. 6A illustrates an example of a running metadata index for a duration of primary content according to one embodiment.
Figure 6B:
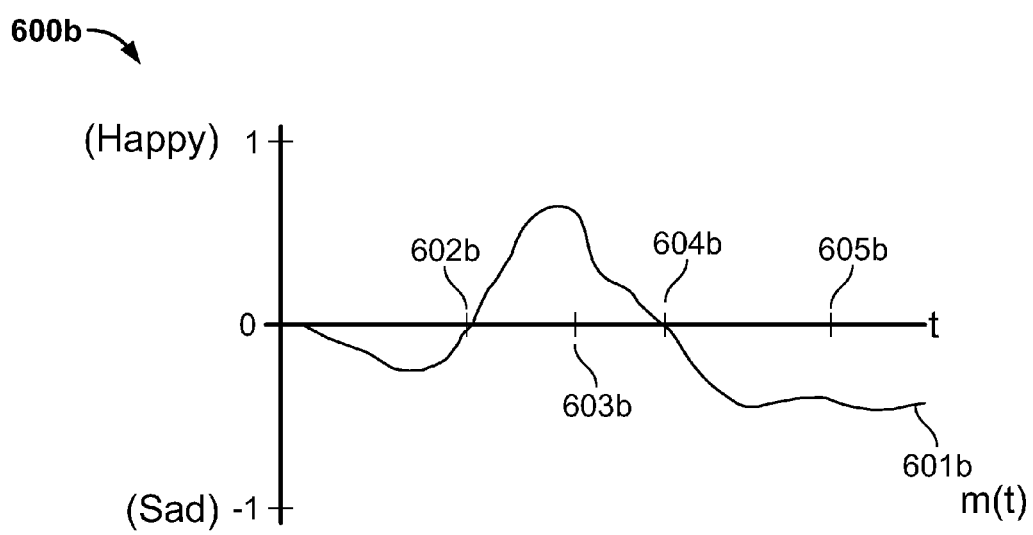
FIG. 6B illustrates an example of inserting secondary content to alter a running metadata index for primary content according to one embodiment.

FIGS. 6A and 6B are illustrations depicting the effect of selecting secondary content based on a running metadata index of primary content according to one embodiment. FIG. 6A is a graphical depiction 600a of a running metadata index for primary content across a duration of time t. As previously discussed for FIG. 3, the running metadata index may be assigned a quantitative value with a base of zero, maximum value of 1, and minimum value of −1. For example, an index value of 1 would represent an extreme maximum mood of happiness in the primary content, and an index value of −1 would represent an extremely minimum value of happiness (or maximum value of sadness) in the primary content. In the example of FIG. 6A, the curve 601*a* may represent a metadata index function m(t) across time t. In this example, the metadata index may correspond to a tragedy story and time points 602*a*, 603*a*, 604*a*, 605*a* may correspond to events in the story which change the mood of the story.

In one embodiment, the selection system may be configured to match and select secondary content to either match a mood m(t) at a particular time point t. Alternatively, the selection system may be configured to detect a trend or change of the mood m'(t) for a spot at a particular time point t, and select secondary content with a similar change of mood across the duration of the secondary content. In yet another embodiment, the selection system may be configured to select secondary content for a spot at particular time point t to creatively alter the mood of the primary content according to a desired result or effect on the viewer.

For example, for a spot at time point 602*a*, the selection system may be configured to match a secondary content with a high happy mood metadata factor or trend to allow the viewer to experience a more happy mood before certain tragic events occur in the story. FIG. 6B is an illustration of an example in which secondary content has been matched for spots corresponding to time points 602*a*, 603*a*, 604*a*, 605*a* of FIG. 6A to alter a mood of primary content.

In another example, the selection system may select secondary content having a metadata profile with a minimum similarity value with the metadata profile of primary content, or a minimum similarity value with a trend of a metadata factor of the primary content. For example, the selection system may match a spot corresponding to time point 604*a* with secondary content with a metadata profile having a high happy mood factor to counteract the happy-to-sad trend m'(t) at time point 604*a*. Matching the secondary content to the spot may produce a change of the mood of the primary content at time point 604*b*, resulting in conveying a desired effect to the viewer perhaps during sad events of the story.

In this way, even though the actual primary content has not been altered, the effect of the combination of the primary content and the modifying effect of the secondary content may maintain or alter the subsequent subjective tone of the primary content according to, or to be consistent with, the intention of the creator of the content so as to enhance the overall experience and enjoyment of the content by the viewer. For example, the primary content may involve a story or discussion involving a country's history or involvement in a war. At a particular spot, the creator or provider of the primary content may want to impart on the viewer a strong sense of national pride based on the context of the primary content before, after, or at the time position of the spot within the primary content. A secondary content may be selected having a metadata value or indicator of strong national pride, such as a clip of the national flag waving, clips of the national bird or animal, clips of national monuments, clips of historic events in the country's history, or other scenes which may instill a strong sense of national pride. As discussed, this may achieve several varying goals of the content creator or provider, including maintaining the subjective tone, shifting the tone, or creating an entirely new tone experienced by the viewer.

In another example, a primary content may consist of long segments of a main storyline with multiple spots having a predetermined length positioned throughout the primary content. Multiple secondary content may be selected to fill the spots to achieve a desired effect on the viewer, where the secondary content is selected based on detected personal and environmental factors of the viewer. For example, a particular secondary content may have a metadata factor which is selected if the primary content is being viewed in the morning, with other secondary content being selected if the primary content is being viewed at other times throughout the day, such as afternoon, evening, late evening, early morning, etc. The detected environmental factors may also be associated with activities throughout the day, such as eating breakfast, lunch, dinner, getting home from work, getting ready for bed, and the like.

In other examples, metadata profiles of secondary content may also be associated with viewing environment information including detected information of the viewing environment such as brightness, ambient noise, video display size, number of viewers, and the like. Viewing environment information may be entered by a user, obtained from third party sources, or detected using various environment detectors including microphones, cameras, and motion sensors.

Figure 7:
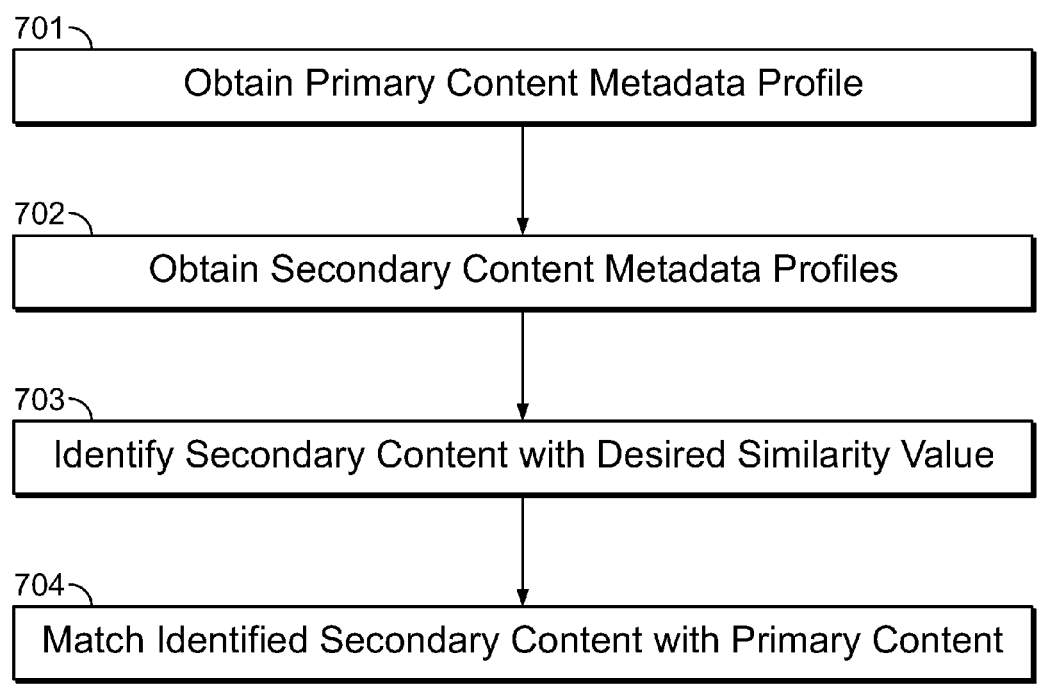
FIG. 7 is a flowchart illustrating an example of a method of matching secondary content based on a metadata profile of primary content according to one embodiment.

In other examples, secondary content may also be selected for having metadata profiles which match with viewing environment information including information of a viewer of the content including personal or biometric information. Information of a viewer may include age, gender, weight, education level, occupation, personal viewing preferences, recently viewed content, favorite brands or products, and the like. Further, biometric information of a viewer may include information such as heart rate, blood pressure, fitness level, exercise frequency, exercise duration, and the like. Personal and biometric information may be entered by a user, obtained from third party sources such as social media information, biometric measurement devices such as heart rate monitors and personal activity monitors, information obtained from the viewer's mobile devices, and the like It will be understood that matching and selecting secondary content to spots of primary content based on the metadata profiles including a running metadata index of the primary content as well as detected personal and environmental factors may have additional and varying uses and results, other than those in the above discussed examples. FIG. 7 is a flowchart illustrating a method of identifying and matching secondary content based on metadata profiles of secondary content with the metadata profile of primary content. At block 701, a metadata profile of primary content is obtained. As previously discussed, this may be generated and stored in a memory by the metadata generator 100, or the metadata generator 100 may generate the metadata profiles contemporaneously with the steps depicted in FIG. 7. At block 702, a metadata profile of secondary content may be obtained. This may include a plurality of candidate secondary content for matching with a spot of the primary content based on the metadata profiles. Next, at block 703, a secondary content of the plurality of secondary content may be identified having a desired similarity value with the metadata profile of the primary content. As previously discussed, the desired similarity value may be a maximum similarity value or a minimum similarity value among the plurality of secondary content, based on a desired effect on the primary content and the viewer. The block 704 then matches the identified secondary content with the primary content to be provided during a spot of the primary content.

Figure 8:
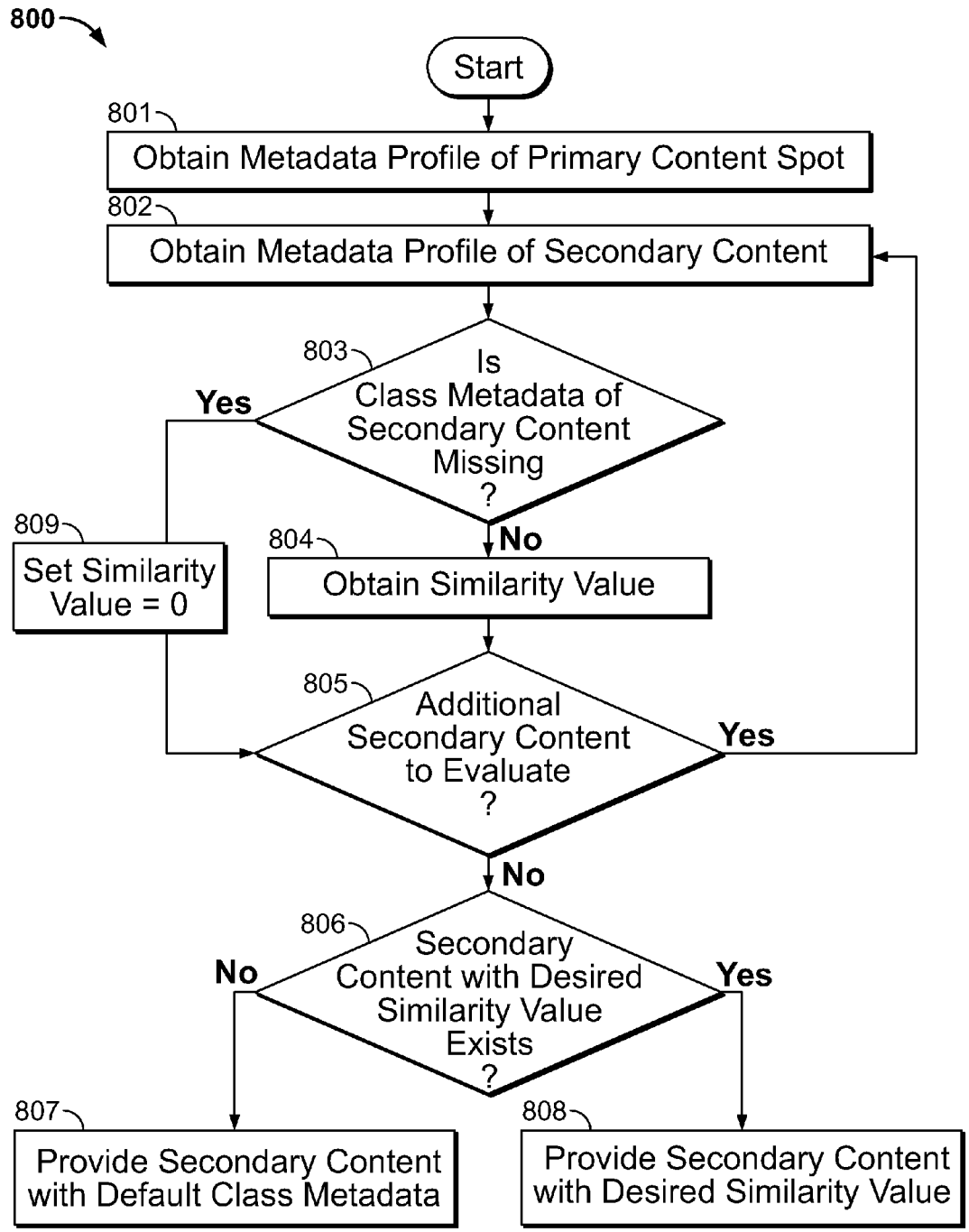
FIG. 8 is a flowchart illustrating an example of a method of matching secondary content based on a metadata profile of primary content according to another embodiment.

FIG. 8 is a flowchart 800 illustrating another embodiment of a method of generating and selecting secondary content based on a metadata profile of primary content. First the metadata profile of associated with a spot of a primary content is obtained at block 801. As previously discussed, this may be generated and stored in a memory by the metadata generator, or the metadata generator may generate the metadata profiles contemporaneously with the steps depicted in FIG. 8. After block 801, a check may be performed for the metadata profile to check whether the spot is missing required metadata class 1 factors, such as language or genre, as previously discussed. If the primary content metadata profile is missing class 1 factors, the remainder of the operations may be bypassed. In other embodiments, the remaining operations may only be bypassed if certain required factors of metadata class 1 are missing from the primary content metadata profile, or the missing factors may be disregarded and the remaining operations may be performed regardless of missing required metadata factors, as depicted in the example of FIG. 8.

At block 802, a metadata profile of secondary content is obtained. A check may then be performed to determine if the metadata profile of the secondary content is missing required metadata factors of class 1 at block 803. If the required metadata factors of class 1 are determined to be missing from the metadata profile of the secondary content, the current secondary content may be set with a similarity value equal to zero 809, or some other neutral insignificant rating value according to the embodiment. Alternatively in other embodiments, if the required metadata factors of class 1 are determined to be missing from the metadata profile of the secondary content, the current secondary content may be disregarded and skipped to evaluate the metadata profile of the next secondary content for consideration at block 805, thereby assigning no similarity value to the secondary content and excluding it from consideration altogether.

If the metadata profile of the secondary content includes all required metadata factors of class 1, block 804 calculates a similarity value of the metadata profiles of the primary content spot and the secondary content, as previously discussed. This may be performed by using a similarity comparison algorithm using a search tree, Boolean logic, set logic, the cosine similarity measure using Equations 1 and 2 as previously discussed, or other data modeling and search and comparison algorithms. This calculated similarity value may also be weighted with preset or generated weights for each metadata class of the secondary content, as previously discussed.

The operation may include storing the calculated similarity value in a memory along with an index or pointer associated with the secondary content, or it may store other values allowing the operation to retrieve the calculated similarity value for later comparison. If there are no remaining metadata profiles for secondary content for similarity value calculation at block 805, the secondary content associated with the highest (or lowest, depending on the desired effect) similarity value of the evaluated secondary content is identified. If secondary content with a desired similarity value (such as maximum or minimum) exists at block 806, the identified secondary content is provided at block 808 to be matched with the spot of the primary content. Alternatively, if no secondary content having a desired similarity value is found, secondary content may identified from secondary content associated with a default class metadata profile at block 807.

Figure 9:
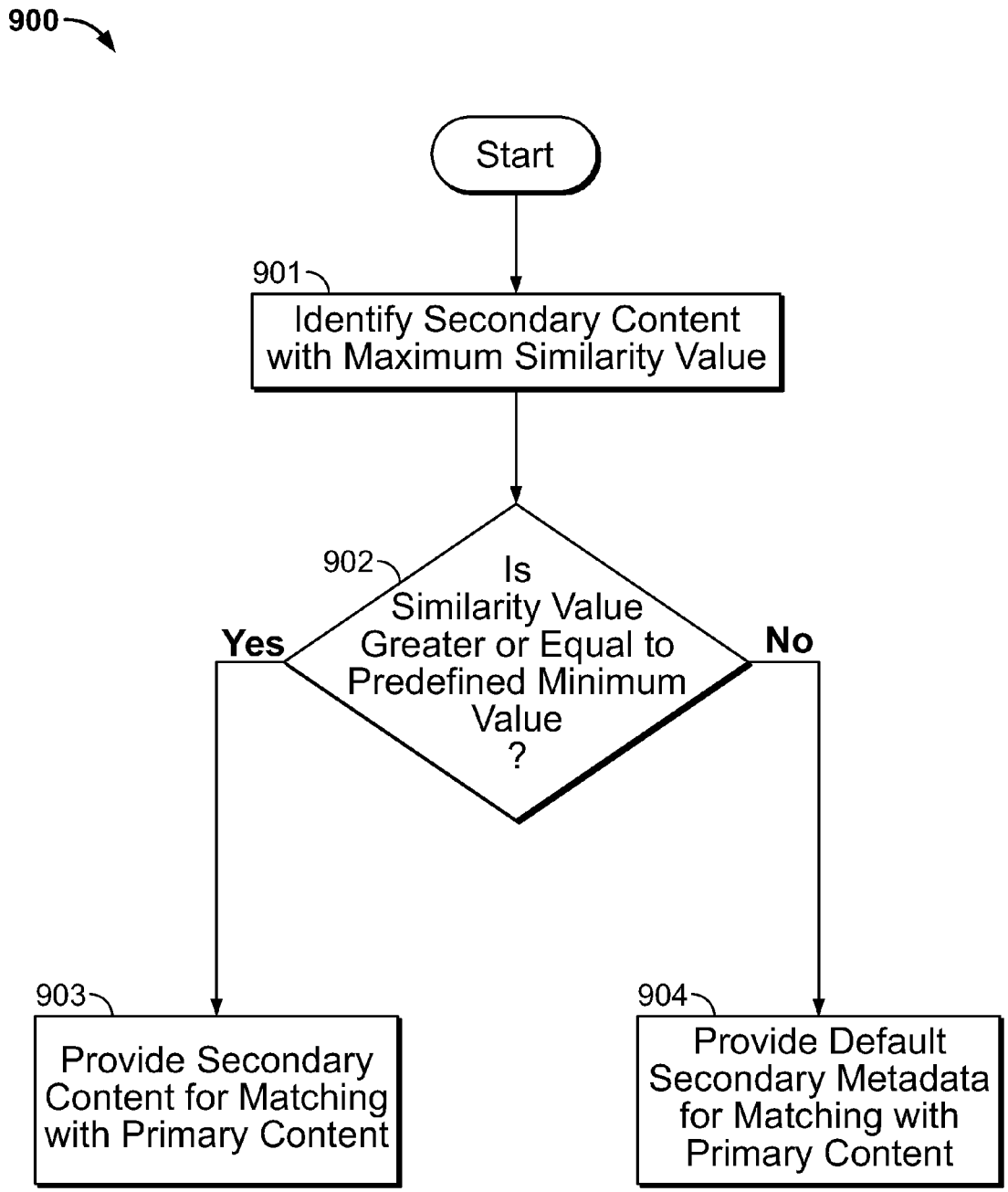
FIG. 9 is a flowchart illustrating an example of a method of selecting secondary content for matching with primary content according to one embodiment.

FIG. 9 is a flowchart 900 illustrating an embodiment of a selecting secondary content based on a metadata profile of primary content. The figure depicts an example in which a secondary content having a maximum similarity value with a spot of the primary content is desired, however it will be understood that this is not limited to a maximum similarity value that is desired, as previously discussed. First a secondary content is identified having a maximum similarity value at block 901. Block 901 may encompass similar operations as those discussed with respect to the embodiment in FIG. 8, wherein secondary content with a desired similarity value is provided, and therefore the operations thereof will not be discussed with respect to this embodiment.

Once a secondary content with a maximum similarity value is identified, Block 902 checks whether the maximum similarity value is greater than or equal to a predefined minimum value 902. The predefined minimum value may be preset by a creator or provider of the primary content, or it may also be generated automatically based on other metadata information, including detected environmental information, personal information regarding the viewer, and the like. In certain embodiments, the predefined minimum value for the same primary content may be varied based on several factors, including time of day, detected heart rate of a viewer, a number of viewers viewing the primary content, and the like.

If it is determined that the maximum similarity value is at least equal to the predefined minimum value, the identified secondary content is selected and provided for matching with the primary content spot 903. However, if the maximum similarity value is not at least equal to the predefined minimum value, a default secondary content may be selected and provided for matching with the primary content spot 904. The default secondary content may have a neutral metadata rating such that it does not have a substantial effect on the metadata of the primary content being viewed, and does not have a strong effect on a viewer of the primary content. Using such an embodiment, a content provider may ensure that unless a secondary content may be sufficiently matched to precisely create the desired effect on either the primary content or the viewer, a neutrally rated secondary content will be selected for matching to the spot of the primary content so as not to unintentionally negatively affect the viewing experience.

According to embodiments of the present invention, a method is provided to calculate similarity values between metadata profiles of a spot in primary content and secondary content. According to other embodiments, the metadata profiles are generated by a metadata generator which detects metadata information from the primary and secondary content. According to an embodiment, the metadata profiles may comprise a running metadata index of the content related to information pertaining to a single metadata factor. According to other embodiments, certain metadata factors are required to be present in secondary content to be considered for selection for a spot in primary content, and certain metadata factors may be classified such that some metadata factors are weighted more heavily than others in the similarity value determination.

Features disclosed with respect to embodiments of the present invention may be suitable for use in systems for storing, reproducing, ingestion, annotation, cataloging, retrieval and distribution of digital assets such as photographs, movies, television productions, animations, video, music and other forms of audio production, etc. Features disclosed may be applied in the distribution of content including stored content and/or streaming content. Features disclosed may also be used to facilitate not only commercial (or non-commercial) distribution of content, but also creation and management of the content through production, editing, post production, cataloging, storage, retrieval, etc. For example, features may be employed to aid processes/operations not related to distribution, such as content creation, content acquisition, creative modification of content, and processing during operations in which a related or unrelated material must be inserted into another portion of material.

According to embodiments of the present invention, a metadata generation unit, a content selection unit, and storage unit in a system may include one or more computer systems, computer processors, storage devices, etc., in order to process and store large amounts of content metadata. Portions of the content may reside in different locations, or may be distributed widely and coordinated with one another, particularly in a large organization. Moreover, particular portions may reside in entirely separate environments, such as content distribution chains, clearing houses, content creation companies, etc.

Various embodiments described herein may be implemented in a computer-readable medium, a machine-readable medium, or similar medium using, for example, software, hardware, or any combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by a controller or a processor.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A content adaptation method for controlling a content selection system, the method comprising:
    generating first metadata associated with a first time point of primary content and second metadata associated with a second time point of primary content, wherein the first time point is before an insertion point for inserting secondary content and the second time point is after the insertion point;
    obtaining a primary metadata profile generated by a metadata generator based on the first metadata and the second metadata, wherein the primary metadata profile is to be associated with the insertion point;
    obtaining secondary metadata profiles generated by the metadata generator, each associated with corresponding secondary content of a plurality of secondary content;
    identifying one of the plurality of secondary content associated with a secondary metadata profile having a similarity value closest to a desired value with the primary metadata profile associated with the primary content;
    matching a selected secondary content with the insertion point of the primary content; and
    outputting to a content distribution system information related to the matched selected secondary content for insertion into the insertion point of the primary content.

2. The method of claim 1, wherein the primary metadata profile comprises information associated with a plurality of metadata factors classified into a plurality of classes of metadata.

3. The method of claim 2, further comprising:
    calculating a class similarity value for each class of the plurality of classes between the primary metadata profile and a secondary metadata profile; and
    totaling all calculated class similarity values of the secondary metadata profile to obtain the similarity value for the secondary metadata profile.

4. The method of claim 3, wherein a weighted value is applied to each class similarity value, wherein the weighted value corresponds to a ranking level for each class.

5. The method of claim 3, wherein one of the plurality of classes is preset as a required class and the method further comprises setting the similarity value associated with the secondary content to zero when the secondary metadata profile associated with the disregarded secondary content is missing a metadata factor of the required class.

6. The method of claim 2, further comprising:
    representing metadata factors of the primary metadata profile as a primary vector;
    representing metadata factors of the secondary metadata profile as a secondary vector; and
    obtaining a similarity value between the metadata factors of the primary metadata profile and the metadata factors of the secondary metadata profile by calculating a similarity between the primary vector and the secondary vector.

7. The method of claim 1, wherein the primary metadata profile is generated based on content information comprising at least closed captioning information associated with the primary content, audio information of the primary content, image information of the primary content, or text information of the primary content.

8. The method of claim 1, wherein the primary metadata profile is generated based on information related to a viewing environment in which the primary content is being viewed, information related to the viewer of the primary content, or information received from a server related to the primary content.

9. The method of claim 1, wherein the desired value is a maximum similarity value or a minimum similarity value among similarity values of the primary metadata profile with each of the plurality of secondary metadata profiles.

10. The method of claim 1, wherein the desired value is a preset value other than a maximum or a minimum similarity value among similarity values of the primary metadata profile with each of the plurality of secondary metadata profiles.

11. The method of claim 1, further comprising matching a default secondary content with the insertion point of the primary content when the similarity values of all secondary metadata profiles associated with the plurality of secondary content do not satisfy a threshold condition.

12. A content adaptation method for controlling a content selection system, the method comprising:
- obtaining a primary metadata profile generated by a metadata generator to be associated with primary content, the primary metadata profile comprising a variable metadata index which tracks changes of a metadata factor for a total duration of the primary content;
- obtaining secondary metadata profiles generated by the metadata generator, each associated with corresponding secondary content of a plurality of secondary content;
- obtaining at least one metadata index value of the primary metadata profile related to an insertion point of the primary content;
- identifying one of the plurality of secondary content associated with a secondary metadata profile closest to a desired value with the primary metadata profile to produce an intended changed metadata index value at a particular time point after the insertion point;
- matching a selected secondary content with the insertion point to produce the intended changed metadata index value at the particular time point; and
- outputting to a content distribution system information related to the matched selected secondary content for insertion into the insertion point of the primary content.

13. The content adaptation method of claim 12, wherein the at least one metadata index value comprises a first index value before the insertion point and a second index value after the insertion point.

14. The content adaptation method of claim 13, wherein the intended changed metadata index value comprises a change of the variable index value between the first index value and a second desired index value.

15. The content adaptation method of claim 12, wherein the variable metadata index is based on information from at least closed captioning information associated with the primary content, audio information of the primary content, image information of the primary content, or text information of the primary content.

16. The content adaptation method of claim 12, wherein the variable metadata index is based on information related to a viewing environment in which the primary content is being viewed, information related to the viewer of the primary content, or information received from a server related to the primary content.

17. A machine-readable non-transitory medium having stored thereon machine-executable instructions for:
- generating first metadata associated with a first time point of primary content and second metadata associated with a second time point of primary content, wherein the first time point is before an insertion point for secondary content and the second time point is after the insertion point;
- obtaining a primary metadata profile generated by a metadata generator based on the first metadata and the second metadata, wherein the primary metadata profile is to be associated with the insertion point;
- obtaining secondary metadata profiles generated by a metadata generator, each associated with corresponding secondary content of a plurality of secondary content;
- identifying one of the plurality of secondary content associated with a secondary metadata profile having a desired similarity value with the primary metadata profile associated with the primary content;
- matching a selected secondary content with the insertion point of the primary content; and
- outputting to a content distribution system information related to the matched selected secondary content for insertion into the insertion point of the primary content.

18. The machine-readable non-transitory medium of claim 17, wherein the primary metadata profile comprises information associated with a plurality of metadata factors classified into a plurality of classes of metadata.

19. The machine-readable non-transitory medium of claim 17, wherein the primary metadata profile comprises information related to a viewing environment in which the primary content is being viewed or information related to the viewer of the primary content.

20. The machine-readable non-transitory medium of claim 17, wherein one of the plurality of classes is preset as a required class and the method further comprises setting a similarity value of a secondary content of the plurality of secondary content to zero when the metadata profile associated with the disregarded secondary content is missing a metadata factor of the required class.

21. The machine-readable non-transitory medium of claim 17, further comprising matching a default secondary content with the insertion point of the primary content when the similarity values of all secondary metadata profiles associated with the plurality of secondary content do not satisfy a threshold condition.

22. A content selection system, the system comprising:
- a communication transceiver; and
- one or more processors configured to:
- generate first metadata associated with a first time point of primary content and second metadata associated with a second time point of primary content, wherein the first time point is before an insertion point for secondary content and the second time point is after the insertion point;
- receive, via the communication transceiver, a primary metadata profile based on the first metadata and the second metadata, wherein the primary metadata profile is to be associated with the insertion point;
- receive, via the communication transceiver, secondary metadata profiles each associated with corresponding secondary content of a plurality of secondary content;
- identify one of the plurality of secondary content associated with a secondary metadata profile having a similarity value closest to a desired value with the primary metadata profile associated with the primary content;
- insert a selected secondary content at the insertion point of the primary content to generate modified primary content; and
- output the modified primary content to a content distribution system via the communication transceiver.

* * * * *